United States Patent [19]
Link

[11] Patent Number: 5,261,182
[45] Date of Patent: Nov. 16, 1993

[54] FISHING LURE

[75] Inventor: Donald J. Link, Savage, Minn.

[73] Assignee: Blue Fox Tackle Co., Cambridge, Minn.

[21] Appl. No.: 709,707

[22] Filed: Jun. 3, 1991

[51] Int. Cl.$^5$ ............................................. A01K 85/00
[52] U.S. Cl. .................. 43/42.36; 43/42.37; 43/42.49; 43/42.28
[58] Field of Search ................. 43/42.36, 42.08, 42.37, 43/42.39, 42.4, 42.45, 42.49, 42.28, 42.25, 42.09

[56] References Cited

U.S. PATENT DOCUMENTS

| | | | |
|---|---|---|---|
| 1,884,053 | 10/1932 | McGarraugh | 43/42.28 |
| 2,750,702 | 6/1956 | Hartig | 43/42.36 |
| 3,079,723 | 3/1963 | Roes | 43/42.37 |
| 3,269,050 | 8/1966 | Garwood | 43/42.36 |
| 3,497,987 | 3/1970 | Perrin | 43/42.37 |
| 4,163,337 | 8/1979 | Kress | 43/42.36 |
| 4,942,689 | 7/1990 | Link | 43/42.36 |
| 4,993,183 | 2/1991 | Carver | 43/42.06 |

*Primary Examiner*—Mark Rosenbaum
*Assistant Examiner*—James Miner

*Attorney, Agent, or Firm*—Robert A. Elwell; Harold D. Jastram; Amy J. Hoffman

[57] ABSTRACT

A fishing lure including three components, a base, a skirt, and a nose. The base has a fishing line attachment, a spacer portion connected at a first end to the fishing line attachment, a bulbus body connected at a first side to an opposite end of the spacer portion, and a hook having a shank, a reverse bend and a point extending from a second side of the body. The skirt component is carried by the spacer portion between the bulbus body and the fishing line attachment. The nose, releasably engages the base adjacent the fishing line attachment. The nose includes a bore capable of passing fishing line and means for protectively covering the fishing line attachment. The lure also has means for suppressing catching upon weeds. The body and spacer portion are cast of lead upon the shank of the hook. The body shape is such that it provides an offset center of gravity relative to the hook shank. The body includes a pair of bilaterally symmetrical wing surfaces which facilitate oriented fall of the lure through water. The weedless features of the preferred embodiment are further enhanced by both the nose and the skirt.

19 Claims, 5 Drawing Sheets

FISHING LURE

BACKGROUND OF THE INVENTION

The present invention relates generally to fishing lures and more specifically to fishing lures having skirts.

Fishing lures having skirts have been know for years. One common application of a skirt is a skirt trailing a "jig" type fishing lure. A typical jig type lure would include a fish hook with a lead body and a trailing skirt typically consisting of a bundle of individual strands of material such as, for example, rubber or plastic fastened behind the weighted body. The strands of the skirt material may be anchored to the rearward portion of the body or alternatively, anchored to a portion of the shank of the hook. The strands generally cover or partially cover the point and reverse bend of the fish hook.

It is standard practice in the industry to paint the lead bodies of jigs by dipping the body and eyelet portion of the lures into a liquid paint. While this painting process provides a decorative or attractive finish upon the body of the jig, it also tends to seal the eyelet of the lure. Prior to use of the lure, the eyelet must be reopened. Reopening while the paint is still soft requires a significant amount of labor which in turn raises the price of the lure. Alternatively, if the painted eyelet is left to be opened by the fisherman, the cured paint has become brittle and the finish upon the jig body is damaged by the fisherman.

The alternative of not painting a jig tends to leave a rather unattractive and somewhat ineffective lead oxide finish upon the body of the lure.

Another desirable feature in fishing lures is a weedless feature. By "weedless" is meant that the lure is generally resistant to snagging on the weeds or weed beds encountered in fishing situations. Generally, modifications to lures which tend to render them weedless, also tend to reduce the lure's fishing effectiveness.

Another desirable feature for manufacturers of fishing tackle is the ability to easily assemble fishing lures. This is also a desirable feature for fisherman since it either reduces the cost of finished lures or allows fishing lures to be assembled on a do-it-yourself basis. Associated with such a desirable feature would be the ability to produce a wide range of exterior finishes or appearances on a common lure base, such as jigs.

Another deficiency often encountered in fishing is abrasion or fraying of the fishing line at or close to the knot which attaches the fishing lure to the fishing line.

SUMMARY OF THE INVENTION

The present invention is a fishing lure including three components, a base, a skirt, and a nose. The base has a fishing line attachment, a spacer portion connected at a first end to the fishing line attachment, a bulbus body connected at a first side to an opposite end of the spacer portion, and a hook having a shank, a reverse bend and a point extending from a second side of the body. The skirt component is carried by the spacer portion between the bulbus body and the fishing line attachment. The nose, releasably engages the base adjacent the fishing line attachment. The nose includes a bore capable of passing fishing line and means for protectively covering the fishing line attachment. In a preferred embodiment, the fishing line attachment is the eyelet of the hook. The lure also has means for suppressing the passage of weeds between the hook point and the shank, for example, at least one resilient bristle which is carried by the body and projects generally towards the point of the hook.

Preferably, the body and spacer portion are cast of lead upon the shank of the hook. In a most preferred embodiment, the body shape is such that it provides a radially offset center of gravity relative to the hook shank. Additionally, the preferred body includes a pair of bilaterally symmetrical wing surfaces which facilitate oriented fall of the lure through water. In a most preferred embodiment, the shank has an offset or bend adjacent the eyelet which displaces the eyelet radially in the same direction as the reverse bend of the hook. In combination with the body having a lower surface, when the lure comes to rest in a fishing situation both the eyelet and the reverse bend of the hook are maintained in an upward directed position facilitating either being engulfed by a fish and/or retrieval by a fisherman with reduced probability of snagging or capturing weeds.

The weedless features of the preferred embodiment are further enhanced by both the nose and the skirt. With respect to the nose, the preferred nose is a tapered non-metallic component having a longitudinal bore extending from the small end toward the large end. The nose also includes a means disposed in the larger end of the object for attaching the object to the leading end of the fishing lure. In a preferred embodiment, the nose consists essentially of silicone rubber, most preferably decorated with a pigment and/or metallic flakes and/or light emitting particles. Preferably the large end of the nose includes two features. One feature is a cavity adjoining the large end and having a first orifice and a second orifice. The first orifice provides communication with the longitudinal bore and the second orifice extends outwardly and provides for releasable mating with a complementary projection of the fishing lure. Preferably the cavity and second orifice are capable of accepting the eyelet on the base of the fishing lure. Additionally, the large end of the nose has a frustaconical indentation. A complementary frustaconical surface is provided on the base adjoining the eyelet and serves to provide support for the large end of the flexible nose. The frustaconical portion of the base also provides a shoulder on the front end of the spacer. In a most preferred embodiment, the cavity of the nose is a cylindrical cavity having a transverse axis. The cylindrical cavity is adapted for limiting radial rotation relative to the eyelet of the fishing lure.

The preferred skirting material is a plurality of strands of silicone rubber. The silicone rubber may be colored with a pigment or left translucent. Additionally, the silicone rubber may optionally include reflective metallic flakes and/or light emitting particles. In a most preferred embodiment, the individual strands of the plurality are bound together by an elastic band placed roughly around the midpoint.

When assembled, the preferred embodiment is extremely weedless since it presents a gradually increasing and relatively smooth cross-section to any obstacles or weeds encountered when being retrieved by a fisherman. For example, the nose tends to gradually increase over its tapered surface from the cross-section of the fishing line to the shoulder adjacent the skirt. The flexible skirt strands tend to project out and rearward from the spacer portion of the lure and thus again tend to generally avoid presenting any weed entrapping or snagging surfaces when retrieved. The bulbus body is generally enclosed within the skirt material which tends to camouflage and prevent catching on weeds and obstacles. The skirting also covers the bristles projecting from the body toward the point of the hook and therefore increases the effectiveness of the bristles in deflecting weeds from the point of the hook. The skirt further tends to cover and camouflage the hook thereby increasing the effectiveness of the lure.

The present invention also includes a method of assembling a skirted lure comprising the steps of providing a skirt including flexible strands and an encircling elastic band. Providing a base having an eyelet, a spacer and a bulbus body. Threading the eyelet of the base through the encircling band and advancing the elastic band and strands rearward along the lure to the spacer portion.

The present invention also includes a method of protecting the knot of a lure comprising the steps of: providing a non-metallic nose having a longitudinal bore and a cavity adjoining the end of the nose and having a first orifice communicating with the bore and a second orifice opening outwardly away from the first orifice. A fishing line is threaded into the nose through the bore, continuing thence through the first orifice, through the cavity and emerging through the second orifice. The fishing line is knotted or tied to an eyelet of the lure and finally, the eyelet is inserted through the second orifice into the cavity of the nose cone.

The present invention also includes a kit for constructing a variety of fishing lures, the kit comprising of a base, a plurality of interchangeable noses and a skirt. Alternatively, the kit may comprise a base, a nose cone and a plurality of interchangeable skirts. The present invention also includes a method of catching fish comprising the steps of providing a fishing lure as described above and presenting the lure to fish in a body of water.

DESCRIPTION OF THE PREFERRED EMBODIMENTS

Figure 1:
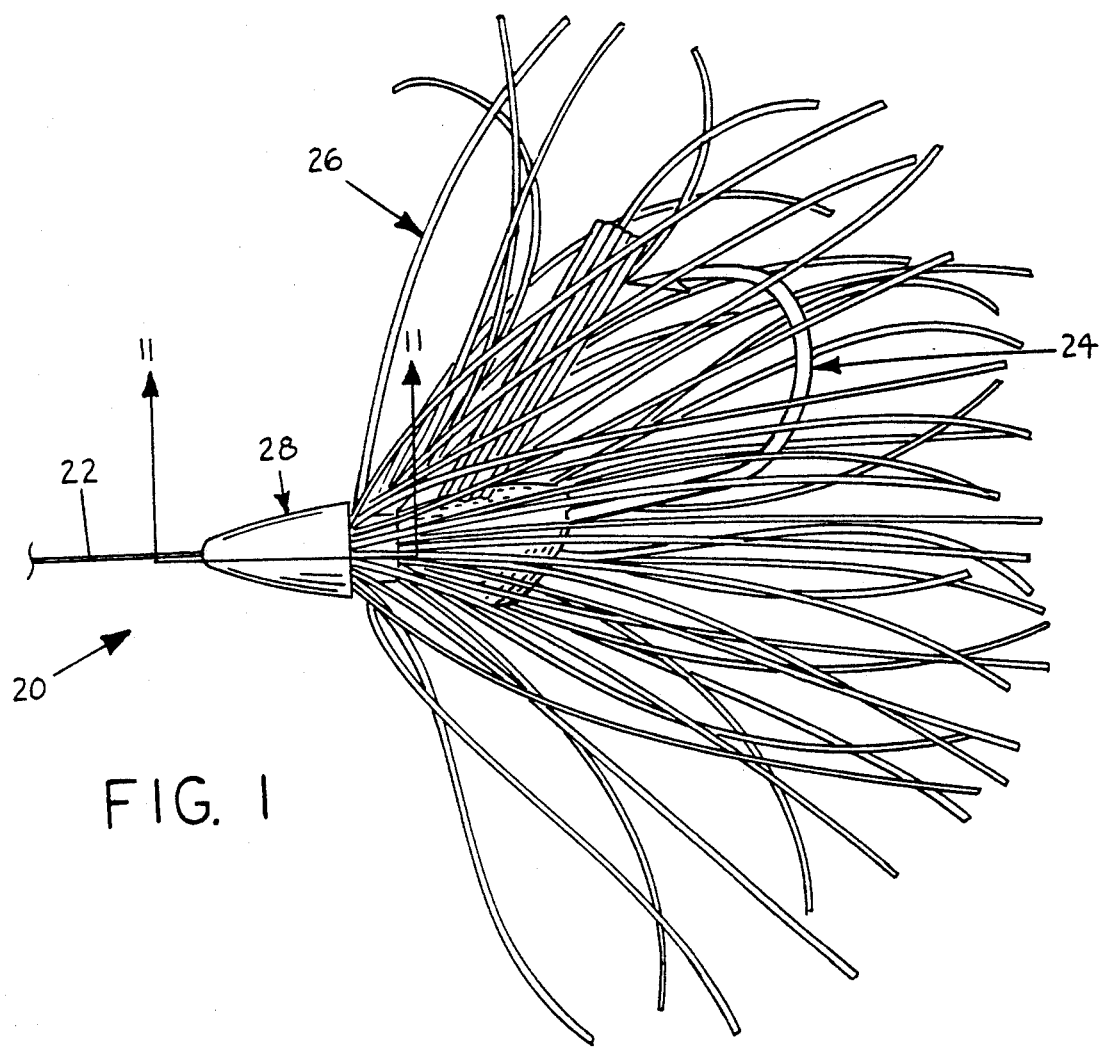
FIG. 1 is a side view of a preferred embodiment of a fishing lure according to the present invention.
Figure 2:
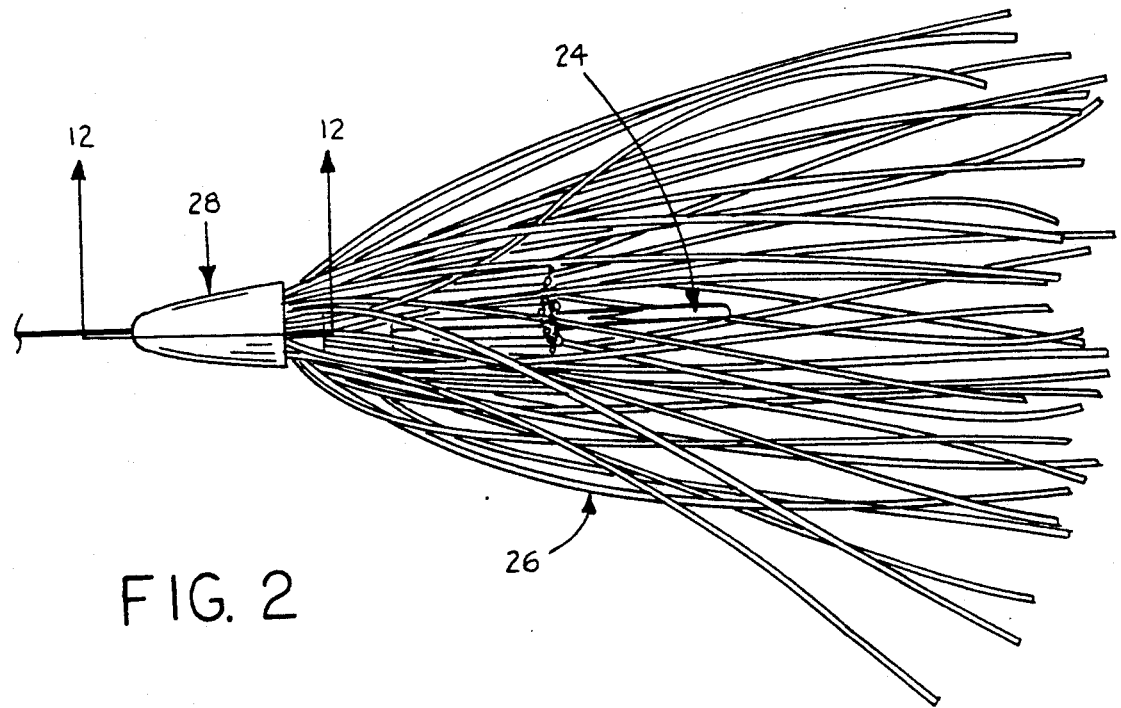
FIG. 2 is a top plan view of the embodiment shown in FIG. 1.
Figure 3A:
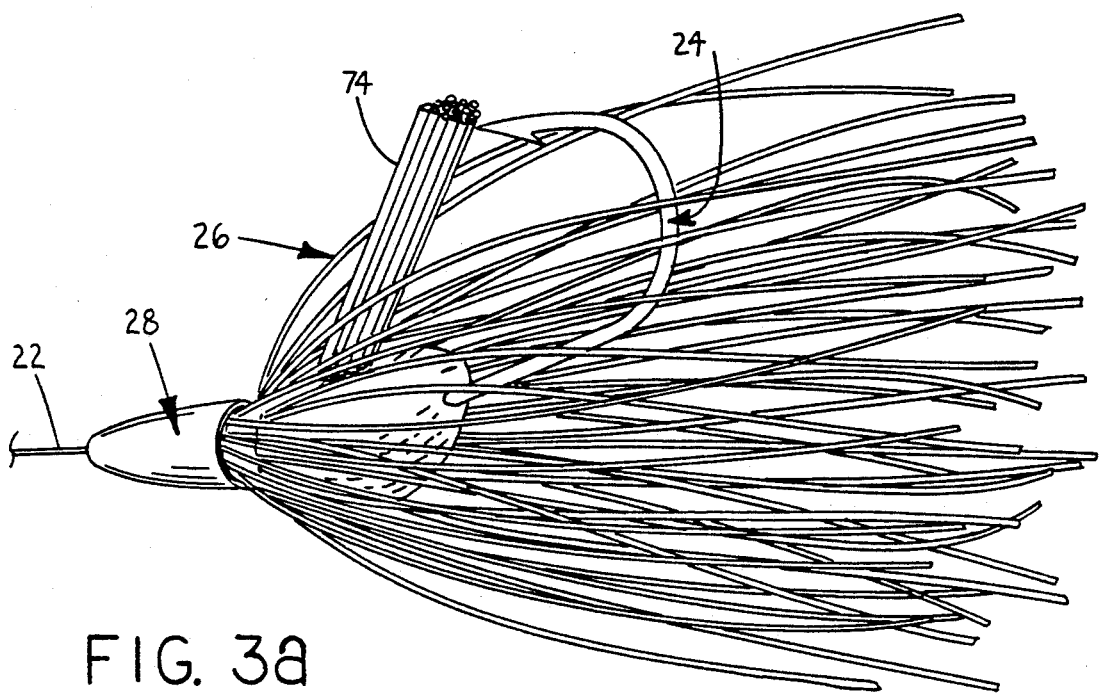
FIG. 3a is a perspective view of the embodiment shown in FIG. 1.
Figure 3B:
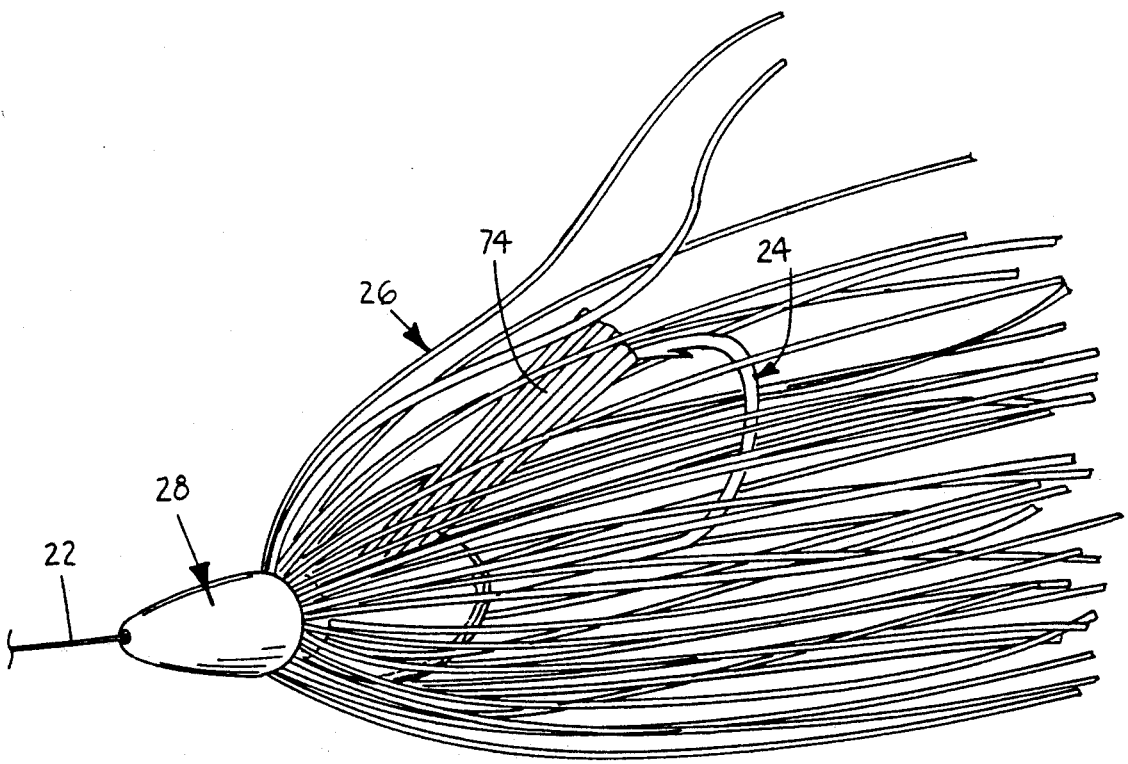
FIG. 3b is another perspective view of the embodiment shown in FIG. 1.

A preferred embodiment of the present invention is depicted at 20 in FIG. 1, attached to fishing line 22. The lure 20 includes three components, a base 24 which is obscured or camouflaged by a skirt 26 and a nose 28. This preferred embodiment 20 is also shown in plan view in FIG. 2 and perspective views in FIGS. 3a and 3b.

Figure 4:
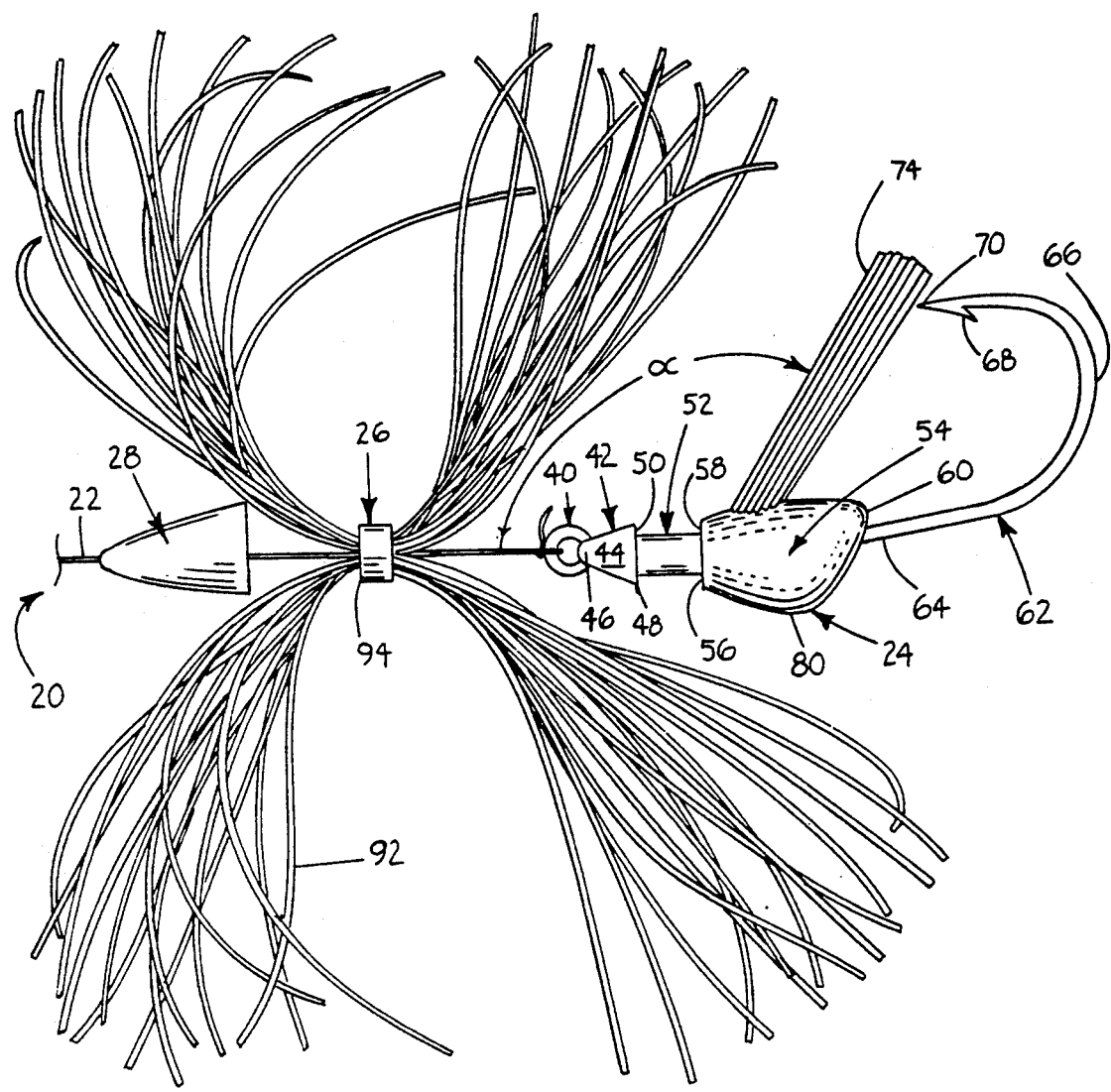
FIG. 4 is an exploded side view of the embodiment shown in FIG. 1.
Figure 5:
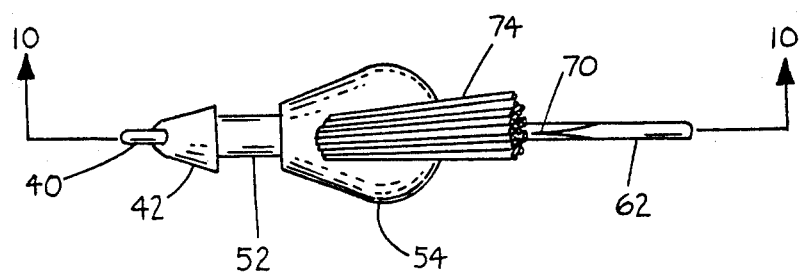
FIG. 5 is a top plan view of the base component shown in FIG. 4.
Figure 6:
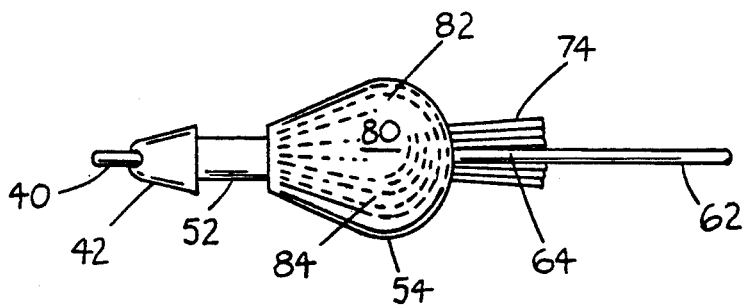
FIG. 6 is a bottom view of the base component shown in FIG. 4.
Figure 7:
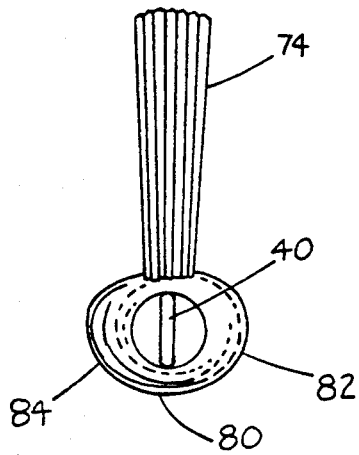
FIG. 7 is a front view of the base component shown in FIG. 4.
Figure 8:
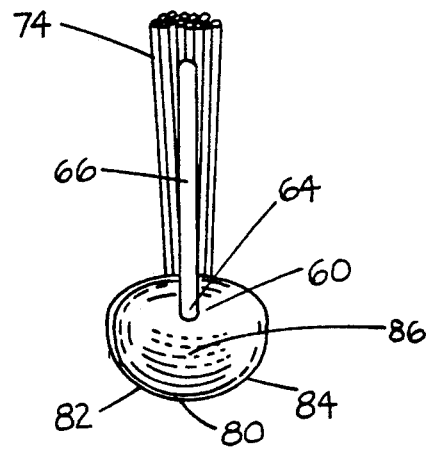
FIG. 8 is a rear end view of the base component shown in FIG. 4.
Figure 9:
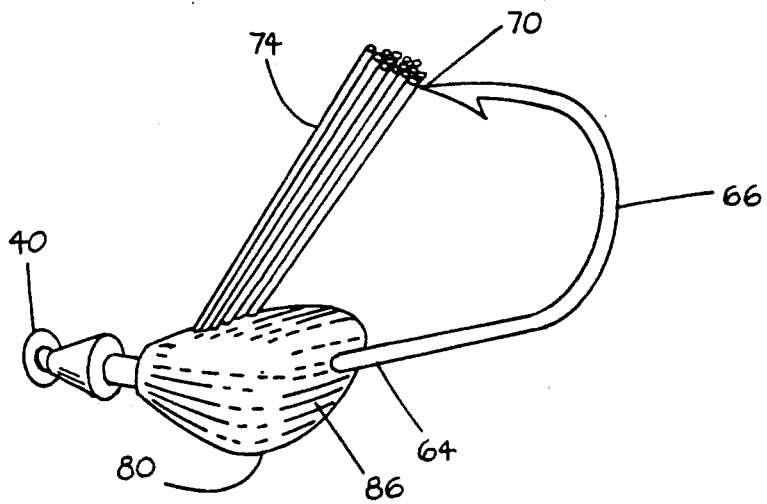
FIG. 9 is a perspective view of the base component shown in FIG. 4.

FIG. 4 shows an exploded view of the lure 20 as it might appear connected to fish line 22. The base 24 has an eyelet 40. The eyelet 40 serves to provide a convenient attachment for the fishing line 22. Alternative means of attachment are known in the art, such as for example, U.S. Pat. No. 4,633,609, the disclosure of which is incorporated herein by reference. However, for reasons which will become apparent from the subsequent discussion, eyelet 40 is the preferred means of attachment. The base 24 also includes a support 42 having a generally frustaconical surface 44. The support 42 is oriented such that its small end 46 adjoins eyelet 40 and its large end 48 leads to an inset or shoulder surface 50. Together, eyelet 40 and support 42 may be viewed as alternatively comprising the fishing line attachment of the base 24.

A spacer portion 52 is connected to the large end 48 of the support 42. The spacer is generally cylindrical, the diameter of a cylindrical spacer portion 52 is less than the diameter of the support 42 at end 48. Thus, a shoulder 50 is present at the forward end of the spacer 52 and the shoulder 50 consists of the face of the large end 48 of the support 42. A body 54 is connected at a first side 56 to the opposite or rearward end 58 of the spacer portion 52. The body 54 also has a second side 60. The second side 60 is generally oppositely directed from the first side 56/58 of the body 54. A hook 62 has a shank 64 extending from the second side 60 of the body 54 and leading to a reverse bend 66, a barb 68, and a point 70. Preferably, the point 70 is directed generally forward on the lure and the barb 68 is on the side of the point facing toward the shank 64. On an upper side 72 of the body 54, at least one and most preferably a plurality of resilient bristles 74 are carried by the body 54. The bristles 74 project from the body 54 generally toward the point 70 of the hook 62. Most preferably some of the bristles of the plurality 74 project slightly in front of the point 70. The bristles 74 serve to suppress the passage of weeds, debris and other objects between the hook point 70 and the shank 64. Most preferably, the bristles 74 are mounted well forward side 72 of the body 54 such that they provide an obtuse angle of, for example, about 135° relative to the fishing line 22 as the lure 20 is pulled through the water. The obtuse angle α increases the effectiveness of the resilient bristles 74 in avoiding snagging or capturing of weeds.

Most preferably, the bristles 74 tend to fan out sideways, in order to further increase their effectiveness in suppressing weed entry near the point 70 of the hook 62.

A lower surface or foot 80 of the body provides a resting point or landing point when the lure 20 has fallen through water. The foot 80 is preferably located approximately two-thirds of the way rearward on the bottom of the body 54. Of course, when the lure 20 has settled through water, some portions of the skirt 26 may be trapped between the foot 80 and the lake bottom. Laterally spaced from the foot are wing surfaces 82 and 84 which facilitate maintenance of a desirable orientation as the lure 20 drops or settles through the water. By a desired orientation, it is meant that the shank 64 of the hook 62 is substantially horizontal and that the point 70 of the hook 62 is generally positioned above the shank 64. It is the opinion of the inventor that such a desirable orientation is most advantageous for successful capturing of fish and achieving weedless performance of the lure 20.

It will be noted that the wing surfaces 82 and 84 are bilaterally symmetrical with respect to the lure 20 and the foot 80. In fact, the entire lure 20 is generally bilaterally symmetrical about a vertical plane defined by the shank 64, reverse bend 66, and point 70 of the hook 62. Rearward of the foot 80 and wings 82 and 84 is a surface 86 connecting the foot 80 and the second surface 62 from which projects the shank 64 of hook 62. This connecting face 86 is preferably, generally parallel to the obtuse angle of the bristles 74 with respect to the fishing line 22.

The construction of the base 24 preferably involves casting of a metal, most preferably a dense metal such as, for example, lead in a two-sided die encasing the shank 64 of a hook 62. As suggested earlier, this economically allows the eyelet 40 of the hook 62 to serve as the fishing line 22 attachment to the lure 20.

Figure 10:
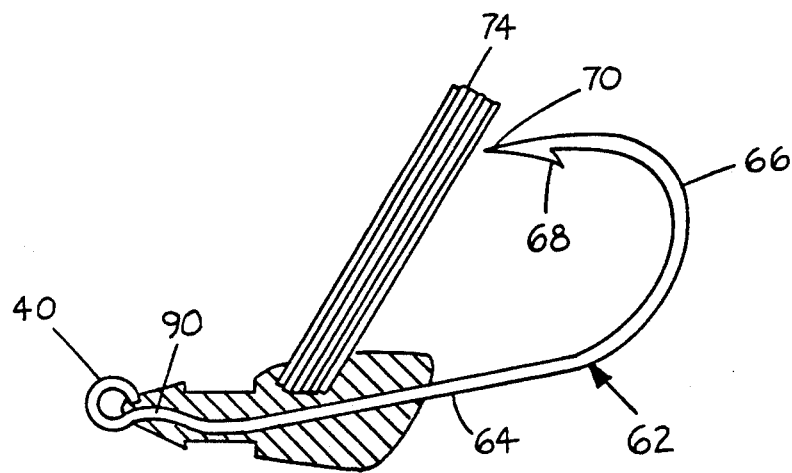
FIG. 10 is a sectional view at 10—10 of FIG. 5 with portions shown whole.

Those skilled in the art will recognize that the use of an eyelet of the fish hook is considerably stronger than provision of a separate and distinct eyelet on the lure 20, however, as indicated earlier, such alternatives are envisioned within the scope of the present invention. Those skilled in the art will also recognize that the amount of lead and the size of the hook can vary and yet maintain the general performance features and advantages of the present invention. The bristles 74 preferably are nylon bristles which, when cast with molten lead at approximately 650° F. partially melts the nylon during the casting process to result in a dependable anchoring or imbedding of the nylon bristles 74 in the body 24. In a most preferred embodiment, the shank 64 of the hook includes an offset or bend 90 adjacent the eyelet 40. Preferably, the offset 90 lies substantially with in the support 42 as shown in FIG. 10. Additionally, the center of gravity of the base 24 lies slightly below the shank 60 which assists in maintaining oriented settling through water. This oriented settling is further assisted by the bristles 74, the upsweep orientation of the reverse bend 66 of the hook 62 and the upward offset of eyelet 40. In addition to the previously discussed wings 82 and 84, the lure 20 tends to maintain the desirable horizontal and upright orientation when settling or when pulled through the water.

SKIRT

The skirt 26 as shown in FIG. 4 includes a plurality of flexible strands 92. The preferred strands are formed of silicone rubber. Most preferably the silicone rubber may be pigmented in colors which are effective for attracting fish, such as, for example, black, yellow or white or alternatively left translucent but optionally carrying reflective metal flakes or light emitting particles. It is highly effective to combine a variety of pigmented, unpigmented strands as well as translucent strands bearing either or both reflective metal flakes or light emitting particles. Preferably, the strands are either round or rectangular in cross-section.

The strands 92 are encircled by an elastic band 94 roughly near their midpoints. The skirt 26 may be easily combined with the base 24 by inserting the eyelet 40 within the band 94 and advancing the band 94 along the base 24, i.e., over the support 42 and into the spacer portion 52. The shoulder 50 tends to effectively inhibit inadvertent removal of the skirt 26 over the forward end of the base 24. A second shoulder 56 that is the first sight of the body 54 prevents the skirt 26 from advancing further rearward on the base 24.

One particular advantage of the skirt 26 placement upon the spacer portion 52 of the lure 20 is the ability to generally remove the occasional weed that may overcome the weed suppression system of the lure 20 is the ability of a fisherman to "slap" the water with the lure at or adjacent one's fishing rod tip to dislodge such occasional weed. In contrast, prior art lures, particularly those of the jig type, having a skirt of this construction which is mounted aft or behind the body of the lure to be generally ineffective at slapping to remove the occasional weed. Such prior art, aft mounted skirts tend to slide down onto the shank of the hook and eventually are trapped at the reverse bend of the hooks of such lures. A fisherman using such a prior art lure must then either reassemble the prior art lure or avoid such procedures and meticulously hand pick any occasional weed from the prior art lure. Such procedures involving the prior art lures are therefore particularly time consuming and inefficient.

Additionally, the lure construction of the present invention is an efficient assembly for a lure manufacturer. It is easier and more efficient to mount the skirt 26 upon a front spacer portion 52 than to mount a rear mounted skirt. Specifically, the prior art manufacturing process involved in the initial mounting of a rear mounted skirt involves insertion of the hook point through the encircling band of a rear mounted skirt, advancing the rear mounted skirt over the barb of the hook, around the reverse bend, and over the shank, to finally reside in a rearward mounted groove. The possibility of a fish hook accidently puncturing the hand of a worker performing such an operation is significant. The present lure is also characterized by the advantage in that it is possible to interchange a skirt from a front mounted skirt location. By contrast, interchanging a skirt from a rear mounted lure almost invariably destroys or partially destroys a skirt which must be removed over the barb of the fish hook.

NOSE

Figure 11:
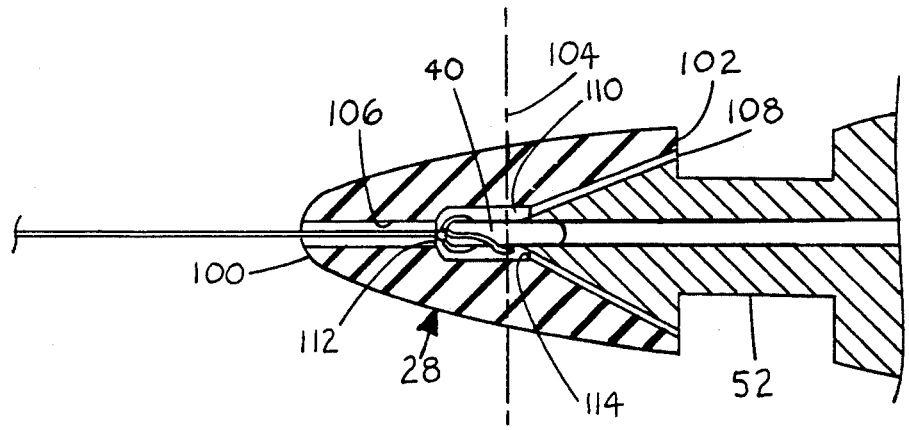
FIG. 11 is a partial sectional view at 11—11 of FIG. 1, with portions shown in whole and portions removed.
Figure 12:
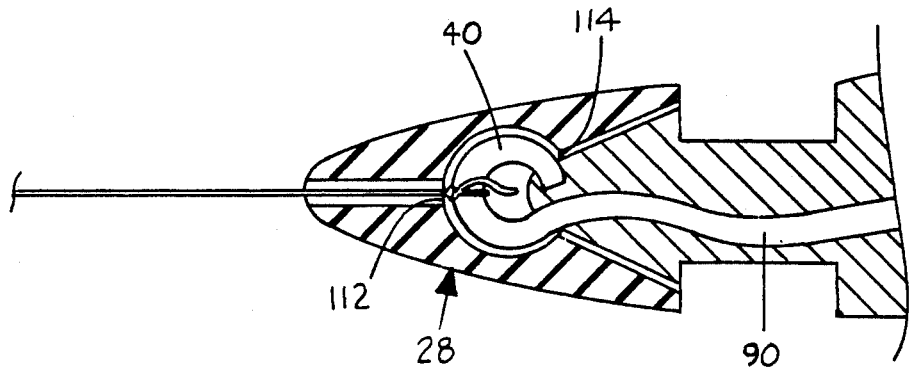
FIG. 12 is a partial sectional view at 12—12 of FIG. 2, with portions removed and portions shown whole.

The nose 28, as shown in FIGS. 11 and 12 has a small leading end 100, a large rearward end 102 and a tapered surface 104. A longitudinal bore 106 extends from the small end 100 towards the large end 102. In the large end 102 is a frustaconical cavity 108 which generally matches and is matable with the frustaconical surface 44 of the support 42. Located at the apex of the frustaconical cavity 108 is a cavity 110. Preferably, the cavity 110 is cylindrical about a transverse axis, that is perpendicular to the bore 106. The cavity 100 has an orifice 112 providing communication with the longitudinal bore 106 and a second orifice 114 extending outwardly and providing from releasable mating with a complimentary projection, such as eyelet 40 of base 24. The nose 28 is formed of non-metallic material, preferably a flexible, rubbery material such as, for example, silicone rubber. Most preferably, the material has a hardness of about 45–55 by a Shore A durometer measurement. The nose 28 may include various coloring pigments or alternatively the translucent with reflective metal flakes or light emitting particles. The cone 28 serves three significant functions in the lure 20. First, the cone improves the weedless characteristic of the overall lure since it substitutes a relatively small end 100 for a substantially larger cross-section eyelet 40. This decreases the probability of weeds contacted by the line being retained the knot at the eyelet. Second, the nose 28 serves to protect the knot of the fishing line 22 upon the eyelet 40 from abrasion and fraying. Third, the nose 28 contributes a wide array of colors to cover a portion of the lure 20. This avoids the necessity of painting the lure 20 and, therefore, further avoids the possibility of paint sealing the eyelet 40. Fourth, the non-metallic material of the nose 29 provides a more desirable texture, i.e., it is soft and resilient rather than the hard metallic texture of the eyelet 40 and lead of the support 42.

It should be noted that the body 24 having a generally bulbus shape immediately behind the skirt 26 tends to flair the strands 92 of the skirt 26 to provide a fuller appearance of the lure 20 in general. The strands 92 of the forward located skirt 26 also serve to contribute to the weedless aspect provided by the bristles 74 and thus further improve the weedlessness. Additionally, the skirt eliminates the necessity to paint the body 24 since they tend to obscure and camouflage the body 24 and the hook 62. This eliminates the necessity of painting and once again reduces the possibility of eyelet 40 being sealed with paint. The action of the nose 28 contributes to the shoulder 50 and further forces the strands 92 which lie on the eyelets 40 side of the lure 20 to be directed at least radially outward rather than forward. It is possible that the large end 102 of the nose 28 may extend slightly over the spacer portion 52 to further direct the strands 92 in a rearward manner.

It is also an embodiment of the present invention to provide the lure 20 as a kit including a base, 24 and either a plurality of skirts 26 or noses 28 or a plurality of both to allow interchangeability and construction of semi-custom lures on and as-needed basis by fisherman or small custom bait shops.

Although the present invention has been described with reference to the preferred embodiments, workers skilled in the art will recognize the changes may be made in form and detail without departing from the spirit and scope of the invention.

What is claimed is:

1. A fishing lure comprising:
   a base including:
   a fishing line attachment;
   a spacer portion connected at a first end to the fishing line attachment;
   a bulbous body connected at a first side to an opposite end of the spacer portion;
   a hook, having a shank, a reverse bend and a point, extending from a second side of the body;
   a skirt carried by the spacer portion between the bulbous body and the fishing line attachment; and
   a nose, releasably engaging the base adjacent the fishing line attachment, the nose including:
   a bore capable of passing fishing line; and
   means for protectively covering the fishing line attachment.

2. The fishing lure of claim 1 and wherein the hook of the base has an eyelet on the shank opposite the reverse bend, and wherein the fishing line attachment of the base is the eyelet of the hook.

3. The fishing lure of claim 2 and wherein the shank extends through the body and the body is characterized by a center of gravity radially offset from the shank.

4. The fishing lure of claim 3 and wherein the reverse bend of the hook is directed opposite to the offset of the body.

5. The fishing lure of claim 1 and further comprising:
   means for suppressing passage of weeds between the hook point and the shank.

6. The fishing lure of claim 3 wherein the means for suppressing include at least one resilient bristle carried by the body and projecting generally toward the point of the hook.

7. The fishing lure of claim 1 and wherein the lure is denser than water and wherein the body includes a pair of bilaterally symmetrical wing surfaces wherein the wing surfaces are characterized by facilitating a vertical orientation of the lure when the lure drops through water.

8. The fishing lure of claim 1 and wherein the body consists essentially of a lead casting encasing a segment of the shank.

9. The fishing lure of claim 8 and wherein the lead is uncoated.

10. The fishing lure of claim 1 and wherein the hook further includes an eyelet and an offset on the shank adjacent the eyelet, the offset radially displacing the eyelet from the shank generally in the same direction as the reverse bend and point of the hook.

11. The fishing lure of claim 1 and wherein the body and spacer portion are a single lead casting encasing adjoining segments of the hook shank.

12. The fishing lure of claim 1 and wherein the eyelet of the hook is separated from the spacer portion by a frustoconical support, the small end of the support adjoining the eyelet and the large end of the support adjoining the spacer portion and having a greater cross-section than the spacer portion so as to provide a shoulder at the first end of the spacer portion.

13. The fishing lure of claim 1 and wherein the spacer portion has a cylindrical surface.

14. The fishing lure of claim 1 and wherein the skirt includes a plurality of limp strands consisting essentially of rubbery material.

15. The fishing lure of claim 14 and wherein the skirt includes a plurality of limp strands bound to the spacer by an encircling elastic band.

16. The fishing lure of claim 14 and wherein the strands further include a fish attracting additive selected from the group consisting of:
   reflective metal flakes,
   light emitting particles, and
   attractant scents.

17. The fishing lure of claim 1 and wherein the nose has a large end and a small end and the means for protectively covering the fishing line attachment of the nose includes:
   a cavity adjoining the large end of the nose;
   a first orifice on the cavity providing communication with the bore; and
   a second orifice, generally opposite the first orifice, the second orifice opening outward and adapted for limited resistance to passage of the eyelet.

18. The fishing lure of claim 17 and wherein the nose further includes a frustoconical cavity in the large end.

19. The fishing lure of claim 17 and wherein the cavity is a cylindrical cavity having a transverse axis, adapted for limiting radial rotation of the nose relative to the eyelet of the fishing lure.

* * * * *